(12) United States Patent
Suzuki et al.

(10) Patent No.: US 10,741,801 B2
(45) Date of Patent: Aug. 11, 2020

(54) RECTANGULAR BATTERY AND METHOD OF MANUFACTURING RECTANGULAR BATTERY

(71) Applicants: Satoshi Suzuki, Toyota (JP); Toshiya Okada, Toyota (JP)

(72) Inventors: Satoshi Suzuki, Toyota (JP); Toshiya Okada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 14/411,288

(22) PCT Filed: Jun. 25, 2013

(86) PCT No.: PCT/IB2013/001353
§ 371 (c)(1),
(2) Date: Dec. 24, 2014

(87) PCT Pub. No.: WO2014/001878
PCT Pub. Date: Jan. 3, 2014

(65) Prior Publication Data
US 2015/0140413 A1    May 21, 2015

(30) Foreign Application Priority Data
Jun. 27, 2012 (JP) .................................. 2012-144562

(51) Int. Cl.
*H01M 2/02* (2006.01)
*H01M 2/04* (2006.01)
*H01M 10/0525* (2010.01)

(52) U.S. Cl.
CPC ............. *H01M 2/024* (2013.01); *H01M 2/04* (2013.01); *H01M 2/043* (2013.01);
(Continued)

(58) Field of Classification Search
CPC .... H01M 2/04; H01M 2/0426; H01M 2/0439; H01M 2/0473; Y10T 29/4911
See application file for complete search history.

(56) References Cited

U.S. PATENT DOCUMENTS 5,556,722 A     9/1996  Narukawa et al.
6,638,661 B2 * 10/2003  Inoue .................. H01M 2/0439
                                              29/623.1
(Continued)

FOREIGN PATENT DOCUMENTS

JP     H07326331 A    12/1995
JP     08315789    *  11/1996
(Continued)

OTHER PUBLICATIONS

U.S. Appl. No. 14/410,148, filed Dec. 22, 2014.
(Continued)

*Primary Examiner* — Ula C Ruddock
*Assistant Examiner* — Thomas H. Parsons
(74) *Attorney, Agent, or Firm* — Oliff PLC

(57) ABSTRACT

A battery case of a rectangular battery has a main body member that has the shape of a bottomed rectangular tube, and a lid member that has the shape of a rectangular plate. The main body member has a rectangular opening portion that is constituted of opening long side portions, opening short side portions, and opening R portions. The lid member seals the opening portion. The opening portion is configured such that each thickness of the opening R portions is larger than each thickness of the opening long side portions respectively. In addition, the opening portion and a lid peripheral edge portion are welded to each other in an airtight manner along an entire circumference thereof, by an energy beam that is radiated from outside the lid member in a thickness direction thereof.

7 Claims, 12 Drawing Sheets

(52) U.S. Cl.
CPC ....... *H01M 2/0426* (2013.01); *H01M 2/0439* (2013.01); *H01M 2/0473* (2013.01); *H01M 10/0525* (2013.01); *H01M 2220/20* (2013.01); *Y10T 29/49108* (2015.01)

(56) References Cited

U.S. PATENT DOCUMENTS

| | | | |
|---|---|---|---|
| 9,370,844 | B2 | 6/2016 | Suzuki et al. |
| 2002/0150817 | A1 | 10/2002 | Grubb et al. |
| 2006/0088761 | A1 | 4/2006 | Ota et al. |
| 2006/0121344 | A1 | 6/2006 | Amagai et al. |
| 2009/0311594 | A1* | 12/2009 | Uh .................... H01M 2/02 429/164 |
| 2011/0081573 | A1 | 4/2011 | Kim et al. |
| 2012/0070722 | A1* | 3/2012 | Fukatsu ............ H01M 2/365 429/185 |
| 2012/0079713 | A1 | 4/2012 | Hosokawa et al. |
| 2015/0318517 | A1 | 11/2015 | Suzuki et al. |

FOREIGN PATENT DOCUMENTS

| | | |
|---|---|---|
| JP | H08329908 A | 12/1996 |
| JP | H11-219688 A | 8/1999 |
| JP | 2001-135282 A | 5/2001 |
| JP | 2001185099 A | 7/2001 |
| JP | 2001351582 * | 12/2001 |
| JP | 2001351582 A * | 12/2001 |
| JP | 2006338992 A | 12/2006 |
| JP | 2009259450 A | 11/2009 |
| JP | 2010205441 A | 9/2010 |
| JP | 2011181215 | 9/2011 |
| JP | 2011-204396 A | 10/2011 |
| JP | 2012079476 A | 4/2012 |

OTHER PUBLICATIONS

Sep. 4, 2015 Office Action issued in U.S. Appl. No. 14/410,148.
Mar. 3, 2016 Notice of Allowance issued in U.S. Appl. No. 14/410,148.

* cited by examiner

<REFERENCE MODE>

<REFERENCE MODE>

<REFERENCE MODE>

<REFERENCE MODE>

RECTANGULAR BATTERY AND METHOD OF MANUFACTURING RECTANGULAR BATTERY

BACKGROUND OF THE INVENTION

1. Field of the Invention

The invention relates to a rectangular battery that has an electrode body accommodated in a metal battery case that has the shape of a rectangular parallelepiped, and to a method of manufacturing this rectangular battery.

2. Description of Related Art

Conventionally, there has been known a rectangular battery that has an electrode body accommodated in a metal battery case that has the shape of a rectangular parallelepiped. This battery case is constituted of a main body member that has the shape of a bottomed rectangular tube and has a rectangular opening portion, and a lid member that has the shape of a rectangular plate and seals the opening portion of this main body member. This main body member and this lid member are bonded to each other in an airtight manner, with the opening portion of the main body member and a peripheral edge portion of the lid member welded to each other along an entire circumference thereof by a laser beam or the like that is radiated from above the lid member. Such a rectangular battery is disclosed in, for example, Japanese Patent Application Publication No. 2010-205441 (JP-2010-205441 A) (see FIGS. 1 to 3 and the like of Japanese Patent Application Publication No. 2010-205441 (JP-2010-205441 A)).

If the opening portion of the main body member and the peripheral edge portion of the lid member collide with each other or come into hard contact with each other upon insertion of the lid member into the opening portion of the main body member in manufacturing the battery, foreign matters such as metal powders and the like are produced. These foreign matters may fall into the main body member to constitute a cause of short-circuiting or the like. In particular, four opening R portions of the opening portion of the main body member, which link opening long side portions and opening short side portions with each other respectively, and are bent in an arcuate manner, and four lid R portions of the peripheral edge portion of the lid member, which face these opening R portions respectively, are likely, for example, to collide with each other respectively at the time of insertion, and to produce foreign matters such as metal powders or the like.

Thus, with a view to preventing the emergence of these foreign matters, as shown in FIGS. 9 and 10, the dimension of a lid member 913 is designed to be slightly smaller than the dimension of an opening portion 911h of a main body member 911. In particular, the dimension of a lid R portion 913r of a peripheral edge portion 913f of the lid member 913 may be set smaller than the dimension of an opening R portion 911r of the opening portion 911h of the main body member 911, to realize a configuration in which the opening R portion 911r and the lid R portion 913r are arranged apart from each other.

However, in the case where a thickness t6 of the opening portion 911h is uniformly equal and the thickness t6 of the opening R portion 911r is small, when a laser beam for welding or the like is radiated from above, the opening R portion 911r greatly fuses (fuses downward in FIG. 11) and the depth of fusion becomes too deep as shown in FIG. 11, so that it may become difficult to bond the opening R portion 911r and the lid R portion 913r to each other. That is, a thickness tb (indicated by arrows in FIG. 11) of a bridge region that links the opening R portion 911r and the lid R portion 913r with each other, as a region of a fused solidified portion 912 into which part of the opening R portion 911r and part of the lid R portion 913r are solidified after being fused tends to be small, and the sealing reliability between the opening R portion 911r and the lid R portion 913r is low. In particular, in the case where the opening R portion 911r and the lid R portion 913r are greatly spaced apart from each other, it is difficult to bond these portions to each other, and the sealing reliability therebetween is low.

On the other hand, if a laser beam or the like is radiated from above with a reduced output in order to prevent the opening R portion 911r from greatly fusing, the volume of those regions of the opening R portion 911r and the lid R portion 913r which are fused by the laser beam or the like is small as shown in FIG. 12, and it may become impossible to bond the opening R portion 911r and the lid R portion 913r to each other via the fused solidified portion 912. Accordingly, in this case as well, the sealing reliability between the opening R portion and the lid R portion is low. In particular, in the case where the opening R portion 911r and the lid R portion 913r are greatly spaced apart from each other, the sealing reliability therebetween is low.

SUMMARY OF THE INVENTION

The invention has been made in view of the foregoing circumstances, and provides a rectangular battery that can make the sealing reliability between a main body member and a lid member high between an opening R portion and a lid R portion, the main body member and the lid member constituting a battery case. A method of manufacturing this rectangular battery is also provided.

Thus, according to one aspect of the invention, there is provided a rectangular battery that has an electrode body, a battery case that is made of metal and has a shape of a rectangular parallelepiped. The battery case accommodates the electrode body and has a main body member and a lid member. The main body member has a shape of a bottomed rectangular tube and has a rectangular opening portion that has a pair of opening long side portions, a pair of opening short side portions, and four opening R portions linking the opening long side portions and the opening short side portions with each other respectively. The four opening R portions are curved with arc shapes respectively. The lid member has a shape of a rectangular plate and is inserted in the opening portion to seal the opening portion. The lid member has a lid peripheral edge portion that has a pair of lid long side portions that face the pair of the opening long side portions respectively, a pair of lid short side portions that face the pair of the opening short side portions respectively, and four lid R portions that face the four opening R portions respectively. In addition, each thickness of the four opening R portions is larger than each thickness of the pair of the opening long side portions respectively. The opening portion of the main body member and the lid peripheral edge portion of the lid member is configured to be welded to each other airtightly along an entire circumference of the opening portion and the lid peripheral edge portion.

According to the rectangular battery as described above, each thickness of the opening R portions of the opening portion of the main body member is set larger than each thickness of the opening long side portions respectively. Each of the opening R portions with the thickness set large has a large thermal capacity, and therefore can prevent the depth of fusion from becoming too deep in the thickness direction thereof in a process of welding. On the other hand, since each thickness of the opening R portions is large and fused solidified portions are formed in large sizes in the process of welding, those regions of the opening R portions and the lid R portions can be ensured of a sufficient volume, and fused solidified portions can be formed in large sizes. Thus, the sealing reliability between the opening R portions and the lid R portions can be made high. Accordingly, in this rectangular battery, the sealing reliability between the main body member and the lid member of the battery case can be made high.

It should be noted herein that in the aforementioned rectangular battery, each thickness of the four opening R portions may be larger than each thickness of the pair of the opening short side portions respectively.

Besides, in the aforementioned rectangular battery, the opening R portions and the lid R portions may also be arranged apart from each other respectively, and may be configured to be bonded to each other airtightly.

According to the rectangular battery as described above, the opening R portions and the lid R portions are configured to be arranged apart from each other respectively. Therefore, when the lid member is inserted into the opening portion of the main body member in manufacturing the battery, the opening R portions and the lid R portions can be prevented from colliding with each other respectively or coming into hard contact with each other respectively to produce foreign matters such as metal powders and the like. On the other hand, if the opening R portions and the lid R portions are arranged apart from each other respectively, it is difficult to weld the opening R portions and the lid R portions to each other respectively, and the sealing reliability therebetween tends to be low, as described above. However, in this rectangular battery, the thickness of each of the opening R portions is set large. Thus, while the depth of fusion of the opening R portions during welding can be restrained, the fused solidified portions that are constituted of parts of the opening R portions and parts of the lid R portions can be formed in a large size. Therefore, the opening R portions and the lid R portions can be reliably welded to each other respectively. Accordingly, although the opening R portions and the lid R portions are spaced apart from each other respectively, the sealing reliability therebetween can also be made high.

Besides, in the aforementioned rectangular battery, each curvature radius of the lid R portions may also be larger than each curvature radius of the opening R portions respectively.

According to the rectangular battery as described above, the curvature radius of the lid R portions is set larger than the curvature radius of the opening R portions respectively. Therefore, a gap can be reliably provided between the opening R portions and the lid R portions respectively. When the lid member is inserted into the opening portion of the main body member in manufacturing the battery, the opening R portions and the lid R portions can be more reliably prevented from, for example, colliding with each other respectively to produce foreign matters such as metal powders or the like. However, although the gap in central regions of the opening R portions and the lid R portions tends to be wide, the thickness of the opening R portions is set large in this rectangular battery. Therefore, the opening R portions and the lid R portions can be reliably welded to each other respectively. Accordingly, although the opening R portions and the lid R portions are greatly spaced apart from each other respectively, the sealing reliability therebetween can also be made high.

Besides, according to another aspect of the invention, there is provided a method of manufacturing a rectangular battery having an electrode body and a battery case. The battery case is made of metal and has a shape of a rectangular parallelepiped. The battery case accommodates the electrode body and has a main body member and a lid member. The main body member has a shape of a bottomed rectangular tube and has a rectangular opening portion that has a pair of opening long side portions, a pair of opening short side portions, and four opening R portions linking the opening long side portions and the opening short side portions with each other respectively. The four opening R portions are curved with arc shapes respectively. The lid member has a shape of a rectangular plate. The lid member has a lid peripheral edge portion that has a pair of lid long side portions that face the pair of the opening long side portions respectively, a pair of lid short side portions that face the pair of the opening short side portions respectively, and four lid R portions that face the four opening R portions respectively. Each thickness of the four opening R portions is larger than each thickness of the pair of the opening long side portions respectively. The opening portion of the main body member and the lid peripheral edge portion of the lid member are configured to be welded to each other airtightly along an entire circumference of the opening portion and the lid peripheral edge portion, by an energy beam that is radiated from outside the lid member in a thickness direction thereof. In the method of manufacturing the rectangular battery, the lid member is inserted into the opening portion of the main body member, and the opening portion and the lid peripheral edge portion are welded to each other along an entire circumference thereof by radiating the energy beam from outside the lid member in the thickness direction thereof.

In the method of manufacturing the rectangular battery as described above, using the main body member in which each thickness of the opening R portions of the opening portion is larger than each thickness of the opening long side portions of the opening portion respectively, the lid member is inserted into the opening portion of this main body member (in an insertion process), and then, the energy beam is radiated from outside the lid member in the thickness direction thereof to weld the opening portion and the lid peripheral edge portion to each other along the entire circumference thereof (in a welding process). The opening R portions of the opening portion have each large thickness and each large thermal capacity respectively. Therefore, the depth of fusion can be prevented from becoming too deep when the energy beam is radiated in the welding process. On the other hand, since each thickness of the opening R portions is large, those regions of the opening R portions and the lid R portions which are fused by the energy beam can be ensured of a sufficient volume, and the fused solidified portions can be formed in a large size. Thus, the sealing reliability between the opening R portions and the lid R portions can be made high. Accordingly, the battery with the enhanced sealing reliability between the main body member of the battery case and the lid member of the battery case can be manufactured.

Incidentally, a laser beam, an electron beam or the like can be mentioned as "the energy beam" used for welding. Besides, a continuous wave (CW) laser such as a fiber laser etc., a pulse laser such as a yttrium aluminum garnet (YAG) laser etc., or the like can be mentioned as the laser.

It should be noted herein that in the aforementioned method of manufacturing the rectangular battery, each thickness of the four opening R portions may be larger than each thickness of the pair of the opening short side portions respectively.

Besides, in the aforementioned method of manufacturing the rectangular battery, in the process of welding the opening portion and the lid peripheral edge portion to each other, the opening R portions and the lid R portions may be arranged apart from each other respectively in the process of inserting the lid member into the opening portion of the main body member, and the opening R portions and the lid R portions may be bonded to each other airtightly via fused solidified portions into which parts of the opening R portions and parts of the lid R portions are solidified respectively after being fused.

According to the method of manufacturing the rectangular battery as described above, the opening R portions and the lid R portions are arranged apart from each other respectively in the insertion process. Therefore, the opening R portions and the lid R portions can be prevented from, for example, colliding with each other respectively to produce foreign matters such as metal powders or the like. On the other hand, if the opening R portions and the lid R portions are arranged apart from each other respectively, it is difficult to weld the opening R portions and the lid R portions to each other respectively, and the sealing reliability therebetween tends to be low as described above. However, in the method of manufacturing this rectangular battery, the thickness of each of the opening R portions is set large. Thus, while the depth of fusion of the opening R portions during welding can be restrained, the fused solidified portions that are constituted of parts of the opening R portions and parts of the lid R portions respectively can be formed in a large size. Therefore, the opening R portions and the lid R portions can be reliably welded to each other respectively. Accordingly, the battery in which the sealing reliability between the opening R portions and the lid R portions is also made high although they are spaced apart from each other respectively can be manufactured.

Besides, in the aforementioned method of manufacturing the rectangular battery, each curvature radius of the lid R portions may also be larger than each curvature radius of the opening R portions respectively.

According to the method of manufacturing the rectangular battery as described above, each curvature radius of the lid R portions is set larger than each curvature radius of the opening R portions respectively. Therefore, gaps can be reliably provided between the opening R portions and the lid R portions respectively. When the lid member is inserted into the opening portion of the main body member in the process of the insertion, the opening R portions and the lid R portions can be more reliably prevented from, for example, colliding with each other respectively to produce foreign matters such as metal powders and the like. However, the gap in central regions of the opening R portions and the lid R portions tends to be wide. However, since each thickness of the opening R portions is set large, the opening R portions and the lid R portions can be reliably welded to each other respectively. Accordingly, the battery in which the sealing reliability between the opening R portions and the lid R portions is also made high although they are spaced apart from each other respectively can be manufactured.

Furthermore, in the aforementioned method of manufacturing the rectangular battery, in the process of welding the opening portion and the lid peripheral edge portion to each other, the pair of the opening long side portions may also be pressed inward respectively to bring the pair of the opening long side portions and the pair of the lid long side portions into close contact with each other respectively, and the opening portion and the lid peripheral edge portion are welded to each other with keeping the close contact with each other.

According to the method of manufacturing the rectangular battery as described above, the opening long side portions are pressed inward respectively (in such a direction as to approach each other) to bring the opening long side portions and the lid long side portions into close contact with each other respectively and perform welding, in the welding process. Thus, the opening long side portions and the lid long side portions can be more reliably welded to each other respectively, and the sealing reliability therebetween can be made higher. On the other hand, in the case where the welding process is thus performed, a gap can be provided between the opening long side portions and the lid long side portions respectively in an unpressed free state. Thus, the opening long side portions and the lid long side portions can be more reliably prevented from, for example, colliding with each other respectively to produce foreign matters such as metal powders and the like in the insertion process.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Figure 1:
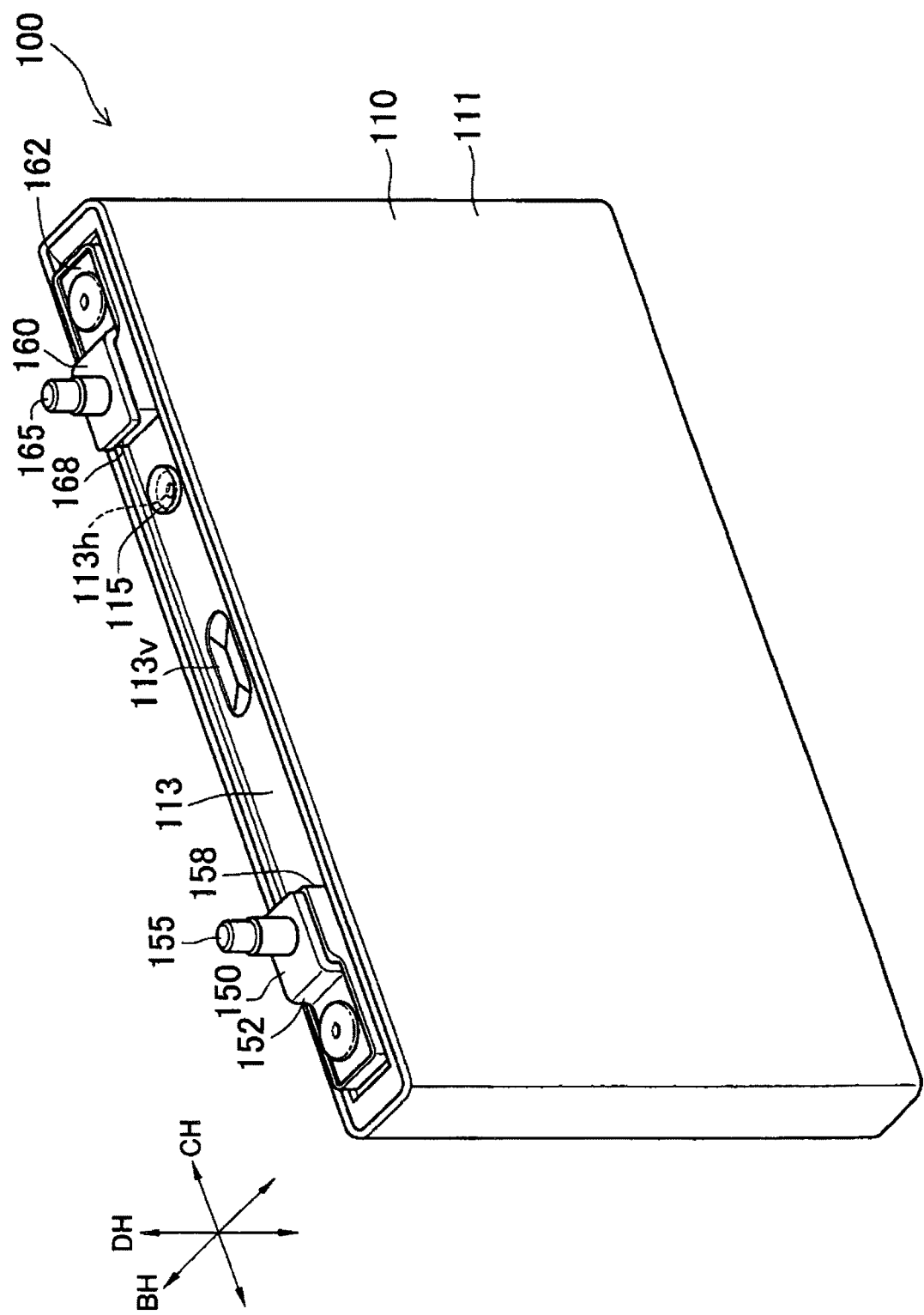
FIG. 1 is a perspective view of a lithium-ion secondary battery according to the embodiment of the invention.
Figure 2:
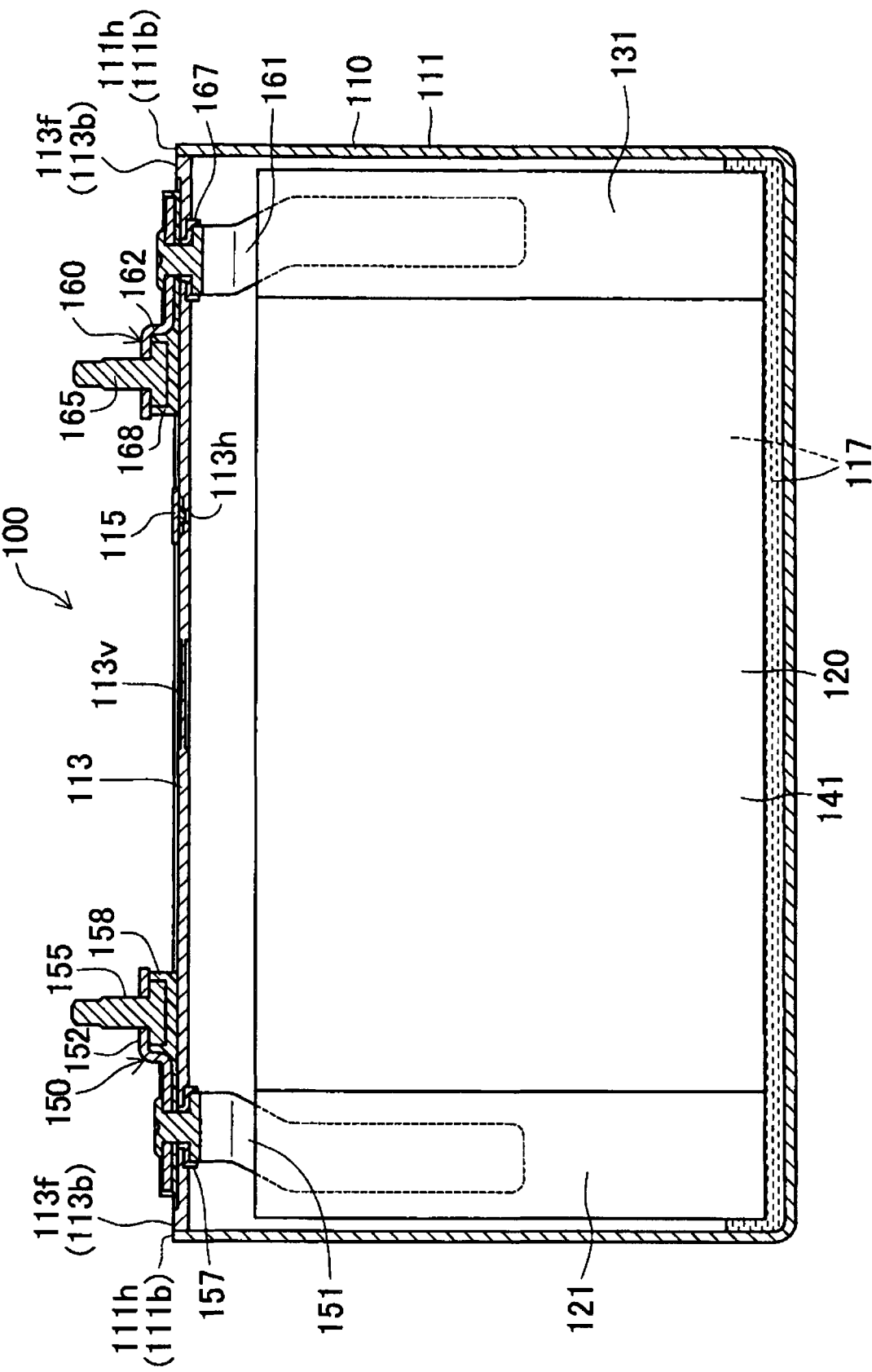
FIG. 2 is a longitudinal sectional view of the lithium-ion secondary battery according to the embodiment of the invention.
Figure 3:
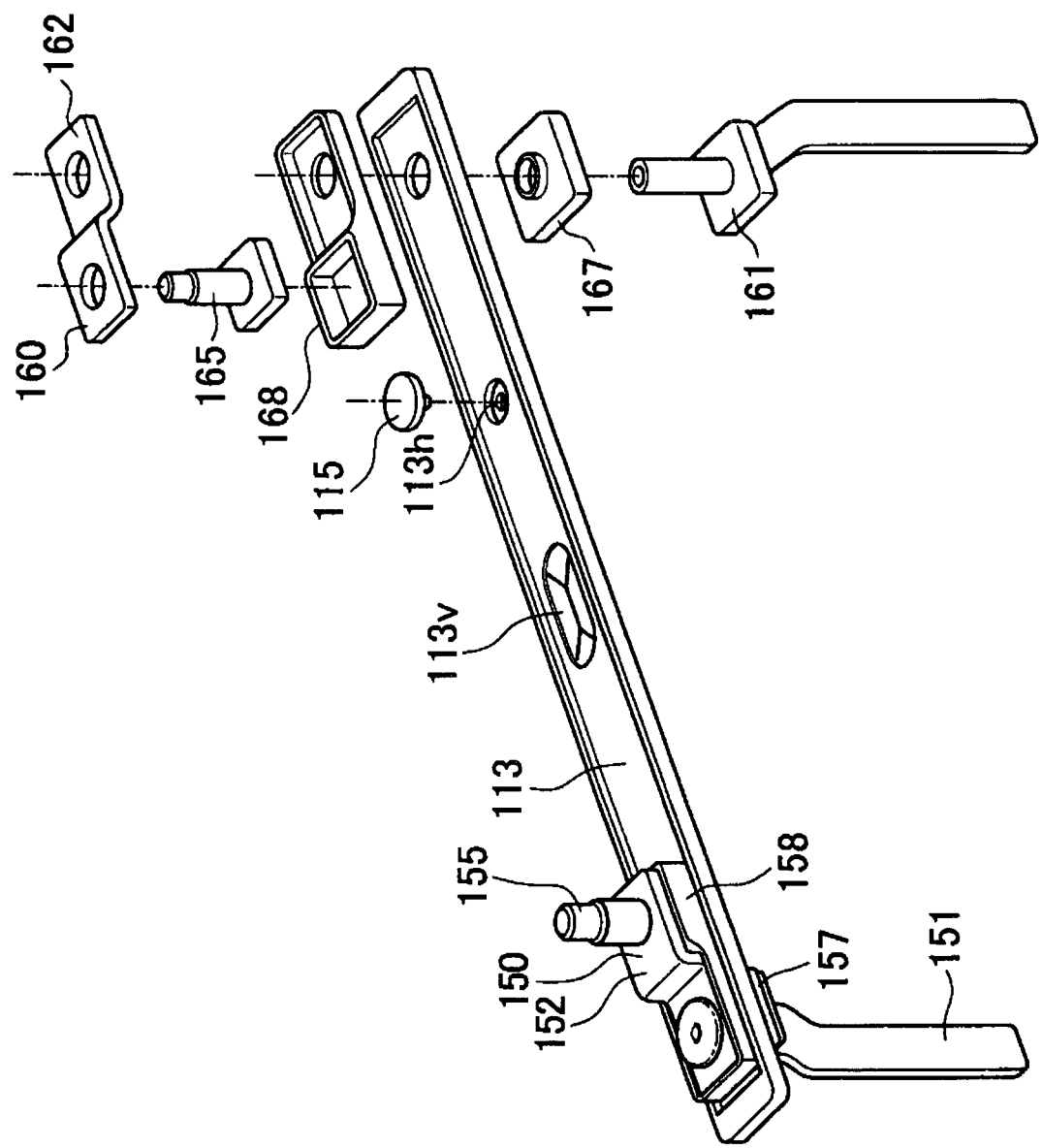
FIG. 3 is an exploded perspective view of a lid member, a positive electrode terminal, a negative electrode terminal, and the like according to the embodiment of the invention.
Figure 4:
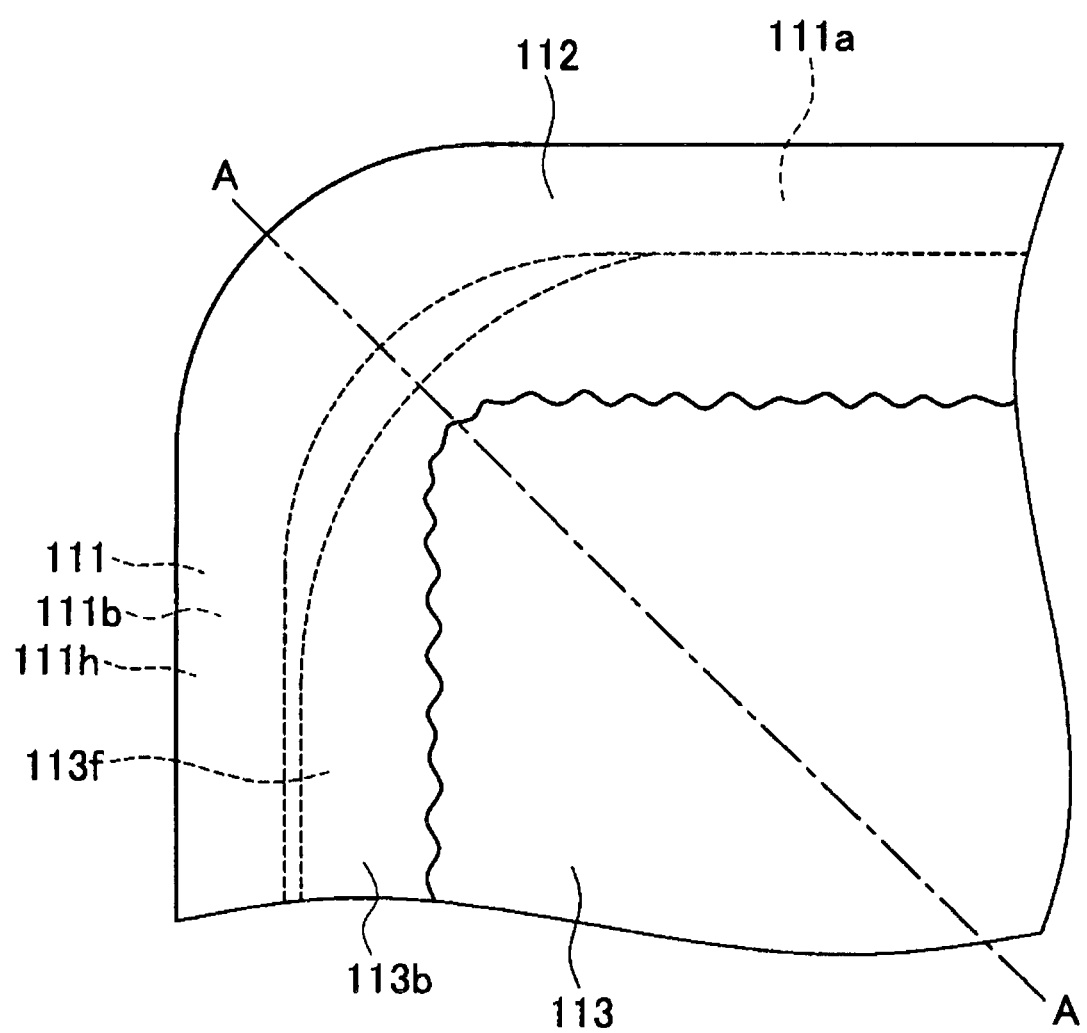
FIG. 4 is an enlarged plan view of the vicinity of an opening R portion and a lid R portion according to the embodiment of the invention as viewed from above.
Figure 5:
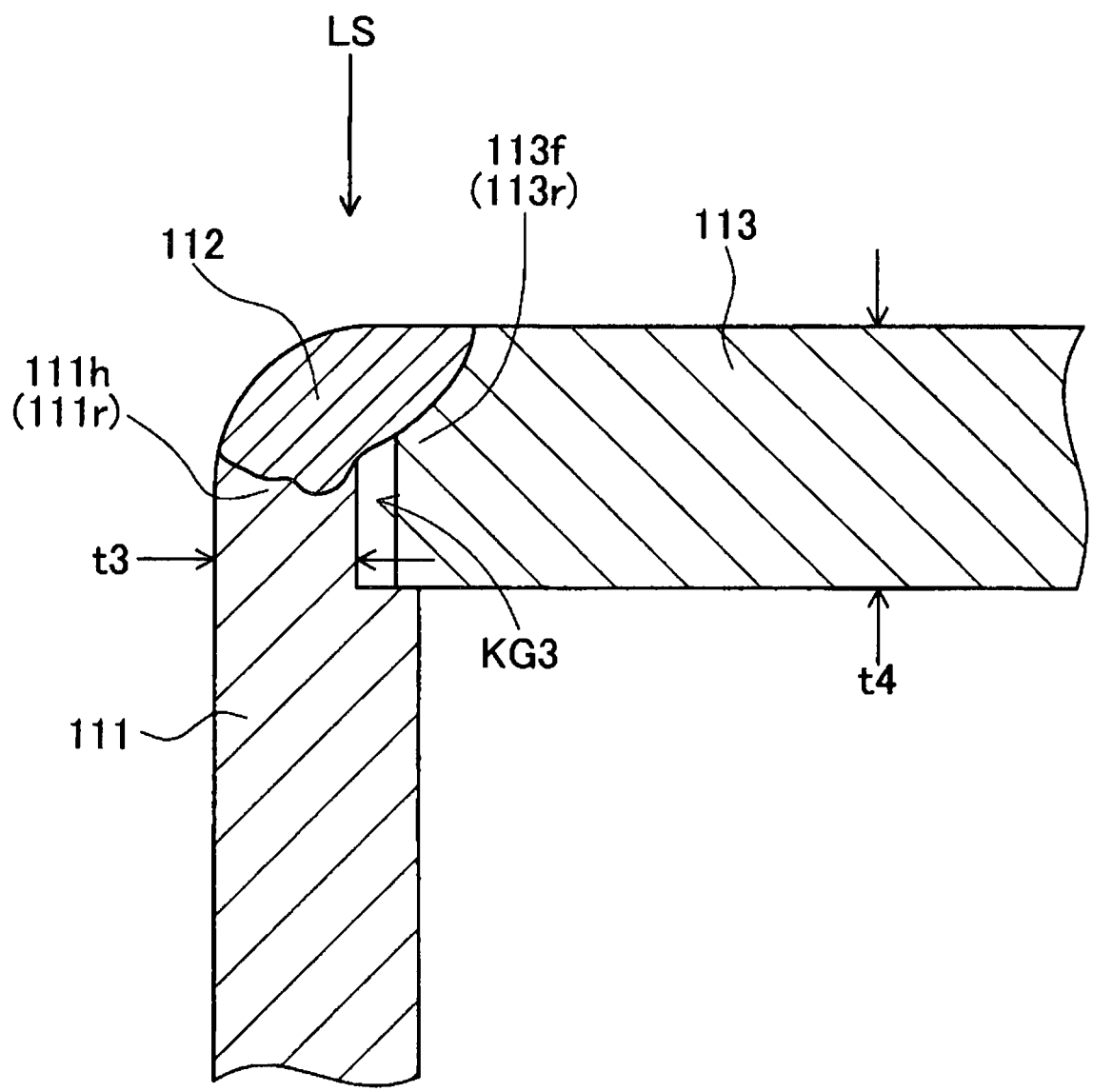
FIG. 5 is a partially enlarged sectional view showing an A-A cross-section in FIG. 4 according to the embodiment of the invention.

The embodiment of the invention will be described hereinafter with reference to the drawings. FIGS. 1 and 2 show a lithium-ion secondary battery 100 (hereinafter also referred to simply as the battery 100) according to this embodiment of the invention. Besides, FIG. 3 shows a lid member 113, a positive electrode terminal 150, a negative electrode terminal 160, and the like. Furthermore, FIGS. 4 and 5 show the vicinity of an opening R portion 111r of a main body member 111 of a battery case 110 and a lid R portion 113r of a lid member 113 of the battery case 110. Incidentally, the following description will be given on the assumption that a thickness direction BH of the battery 100, a width direction CH of the battery 100, and a height direction DH of the battery 100 are defined as shown in FIGS. 1 and 2. Besides, the description will be given on the assumption that an upper region in each of FIGS. 1 to 3 is an upper side of the battery 100, and that a lower region in each of FIGS. 1 to 3 is a lower side of the battery 100.

This battery 100 is a rectangular sealed battery that is mounted on a vehicle such as a hybrid vehicle, an electric vehicle or the like, or on a battery-powered machine such as a hammer drill or the like. This battery 100 is constituted of the battery case 110 that has the shape of a rectangular parallelepiped, a flatly wound-type electrode body 120 that is accommodated in this battery case 110, a positive electrode terminal 150 that is supported by the battery case 110, a negative electrode terminal 160 that is supported by the battery case 110, and the like (see FIGS. 1 and 2). Besides, a non-aqueous electrolytic solution 117 is held in the battery case 110.

Among these components, the electrode body 120 is accommodated in the battery case 110 in such a toppled state (N.B. what is vertically placed on the plane of the drawing is inclined by 90° onto the plane of the drawing in a lateral direction) that an axis (a winding axis) of the electrode body 120 extends parallel to the width direction CH of the battery 100 (see FIG. 2). This electrode body 120 is obtained by superimposing a band-shaped positive electrode plate 121 and a band-shaped negative electrode plate 131 on each other via two band-shaped separators 141 and 141, winding them around the axis, and flatly compressing them. Part of the positive electrode plate 121 in the width direction protrudes from the separators 141 and 141 while forming a swirl on one side in the axial direction (on the left side in FIG. 2), and connects to the aforementioned positive electrode terminal (a positive electrode terminal member) 150. Besides, part of the negative electrode plate 131 in the width direction protrudes from the separators 141 and 141 while forming a swirl on the other side in the axial direction (on the right side in FIG. 2), and connects to the aforementioned negative electrode terminal (a negative electrode terminal member) 160.

Next, the battery case 110 will be described. This battery case 110 is formed of a metal (more specifically, aluminum). This battery case 110 is constituted of a main body member 111 and a lid member 113 (see FIGS. 1 and 2). The main body member 111 has the shape of a bottomed rectangular tube, and has a rectangular opening portion 111h only on an upper side thereof. The lid member 113 has the shape of a rectangular plate, and is inserted into the opening portion 111h of this main body member 111 to seal the opening portion 111h.

Among these components, the rectangular opening portion 111h of the main body member 111 is constituted of a pair of opening long side portions 111a and 111a (see FIG. 6), a pair of opening short side portions 111b and 111b (see FIG. 6), and four opening R portions 111r and 111r that link these opening long side portions 111a and these opening short side portions 111b with each other respectively and are bent in an arcuate manner (see FIGS. 4 and 5). A thickness t1 (see FIG. 6) of each of the opening long side portions 111a and 111a is 0.40 mm. Besides, a thickness t2 (see FIG. 6) of each of the opening short side portions 111b and 111b is also 0.40 mm. In contrast, a thickness t3 of each of the opening R portions 111r and 111r is 0.45 mm, which is larger than the thickness t1 of the opening long side portions 111a and 111a and the thickness t2 of the opening short side portions 111b and 111b (t3>t1 and t3>t2). Incidentally, the thickness t3 of the opening R portions 111r represents a thickness of the opening R portions 111r at centers thereof.

A non-return-type safety valve 113v is provided in the vicinity of a center of the lid member 113 in a longitudinal direction thereof (the width direction CH of the battery 100) (see FIGS. 1 to 3). Besides, a liquid injection hole 113h that is used in injecting the electrolytic solution 117 into the battery case 110 is provided in the vicinity of this safety valve 113v, and is sealed in an airtight manner by a sealing member 115. Besides, a positive electrode terminal (a positive electrode terminal member) 150 and a negative electrode terminal (a negative electrode terminal member) 160, which are configured to extend outward from inside the battery case 110, are fixedly installed in the vicinity of both ends of the lid member 113 in the longitudinal direction thereof, respectively.

More specifically, each of this positive electrode terminal 150 and this negative electrode terminal 160 connects to the electrode body 120 in the battery case 110. On the other hand, each of the positive electrode terminal 150 and the negative electrode terminal 160 is constituted of a corresponding one of first terminal members 151 and 161 that extend to the outside of the battery case 110 through the lid member 113, and a corresponding one of cranked second terminal members 152 and 162 that are arranged on the lid member 113 and fixed to the first terminal members 151 and 161 through caulking respectively. Each of the positive electrode terminal 150 and the negative electrode terminal 160 is fixed to the lid member 113 together with a corresponding one of metal fastening members 155 and 165 for fastening a connection terminal outside the battery, such as a bus bar, a crimped terminal or the like, to this positive electrode terminal 150 and this negative electrode terminal 160 respectively, via a corresponding one of resinous first insulation members 157 and 167 that are arranged inside the lid member 113 (inside the case), and a corresponding one of resinous second insulation members 158 and 168 that are arranged outside the lid member 113 (outside the case).

Figure 6:
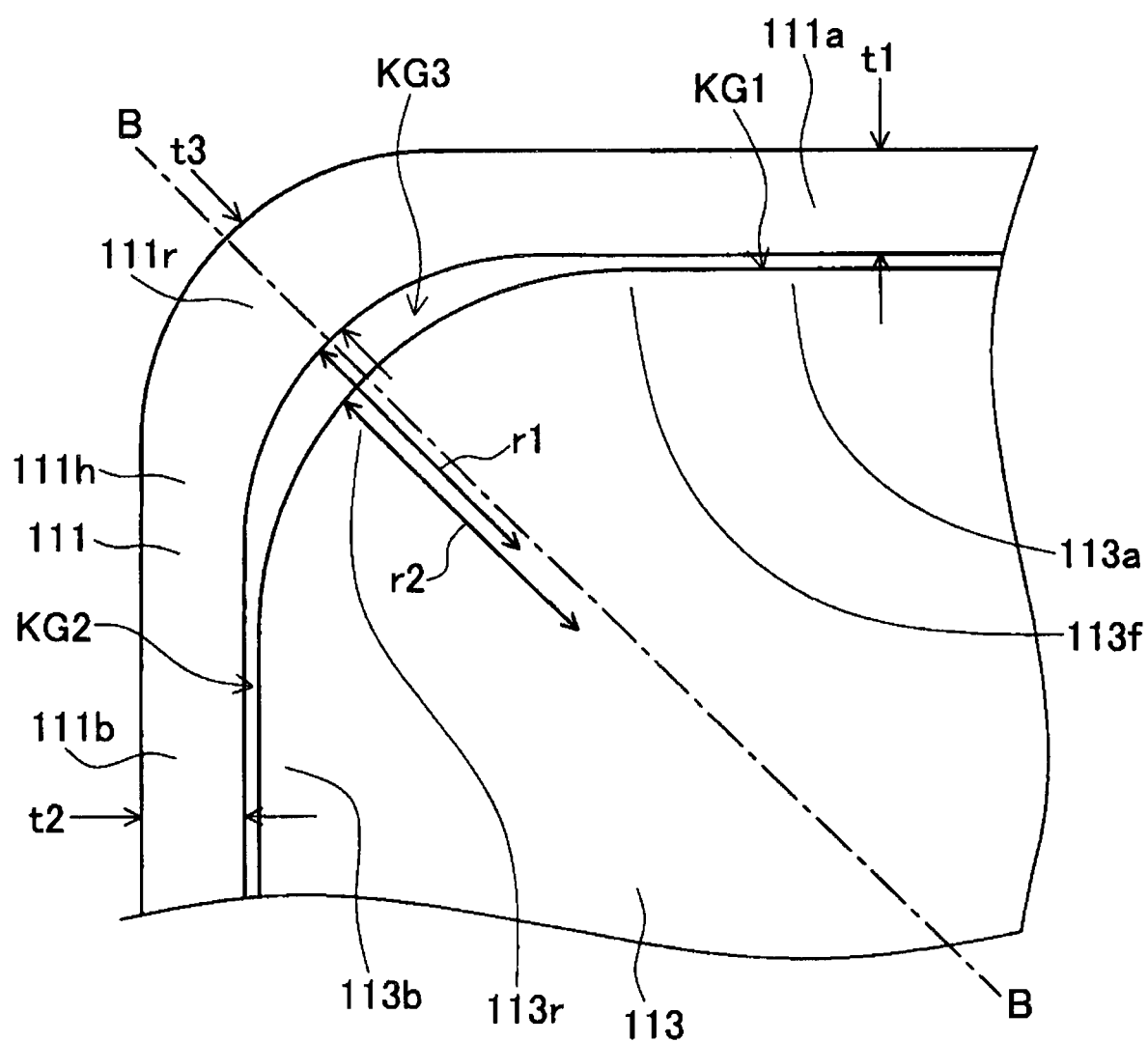
FIG. 6 is an illustrative view showing a relationship between an opening portion of a main body member and a lid member that is inserted in this opening portion according to the embodiment of the invention.

A thickness t4 of this lid member 113 is 1.00 mm, which is larger than any one of the thicknesses t1, t2, and t3 of the aforementioned main body member 111 (t4>t1, t4>t2, and t4>t3) (see FIGS. 5 and 6). Besides, a lid peripheral edge portion 113f of this lid member 113 is constituted of a pair of lid long side portions 113a and 113a, a pair of lid short side portions 113b and 113b, and four lid R portions 113r and 113r that link these lid long side portions 113a and these lid short side portions 113b with each other respectively and are bent in an arcuate manner (see FIGS. 4 and 5). Among these portions, the lid long side portions 113a and 113a face the opening long side portions 111a and 111a of the main body member 111 respectively. Besides, the lid short side portions 113b and 113b face the opening short side portions 111b and 111b of the main body member 111 respectively. Besides, the lid R portions 113r and 113r face the opening R portions 111r and 111r of the main body member 111 respectively (see FIGS. 4 and 5).

The opening long side portions 111a and 111a and the lid long side portions 113a and 113a abut on each other respectively without forming a gap therebetween (N.B., although FIG. 6 seems to depict the presence of a gap KG1, the gap KG1 exists in a free state prior to welding, but ceases to exist due to abutment during welding and after welding, as will be described later as to "a welding process"). In contrast, the opening short side portions 111b and 111b and the lid short side portions 113b and 113b are spaced apart from each other respectively via a very narrow gap KG2. Besides, the opening R portions 111r and 111r and the lid R portions 113r and 113r are spaced apart from each other respectively via a gap KG3 that is wider than the aforementioned gap KG2. A curvature radius r2 (see FIG. 6) of the lid R portions 113r and 113r is set larger than a curvature radius r1 of the opening R portions 111r and 111r respectively. Thus, the gap KG3 can be reliably provided between the opening R portions 111r and the lid R portions 113r respectively.

The main body member 111 and the lid member 113 are bonded to each other through welding. More specifically, the opening portion 111h of the main body member 111 and the lid peripheral edge portion 113f of the lid member 113 are welded in an airtight manner along an entire circumference thereof by an energy beam LS (more specifically, a laser beam) that is radiated from outside the lid member 113 in the thickness direction thereof (from above the lid member 113), as will be described later. That is, the opening portion 111h and the lid peripheral edge portion 113f are bonded to each other in an airtight manner, via fused solidified portions 112 which have a square shape in a plan view and into which part of the opening portion 111h and part of the lid peripheral edge portion 113f are solidified after being temporarily fused.

As described above, the battery case 110 of this battery 100 is configured such that the thickness t3 of the opening R portions 111r and 111r of the opening portion 111h of the main body member 111 thereof is set larger than the thickness t1 of the opening long side portions 111a and 111a respectively (t3>W. The opening R portions 111r with the thickness t3 that is set large has a large thermal capacity, and therefore can prevent the depth of fusion from becoming too deep when the laser beam LS is radiated from outside the lid member 113 in the thickness direction thereof, as will be described later. On the other hand, since the thickness t3 of the opening R portions 111r is large, those regions of the opening R portions 111r and the lid R portions 113r which are fused by the laser beam LS can be ensured of a sufficient volume, so that the fused solidified portions 112 can be formed in a large size. Thus, the sealing reliability between the opening R portions 111r and the lid R portions 113r can be made high. Accordingly, in this battery 100, the sealing reliability between the main body member 111 of the battery case 110 and the lid member 113 of the battery case 110 can be made high.

Furthermore, in this battery 100, the opening R portions 111r and 111r and the lid R portions 113r and 113r are arranged apart from each other respectively. In particular, since the curvature radius r2 of the lid R portions 113r and 113r is set larger than the curvature radius r1 of the opening R portions 111r and 111r respectively, the gap KG3 is reliably formed between the opening R portions 111r and the lid R portions 113r. Thus, when the lid member 113 is inserted into the opening portion 111h of the main body member 111 in manufacturing the battery 100, the opening R portions 111r and the lid R portions 113r can be more reliably prevented from colliding with each other respectively or coming into hard contact with each other respectively to produce foreign matters such as metal powders and the like.

On the other hand, if the opening R portions 111r and the lid R portions 113r are arranged apart from each other respectively, it is difficult to weld these portions to each other respectively, and the sealing reliability therebetween tends to be low. However, in this rectangular battery 100, the thickness t3 of the opening R portions 111r is set large. Thus, while the depth of fusion of the opening R portions 111r during welding thereof can be restrained, the fused solidified portions 112 that are constituted of parts of the opening R portions 111r and parts of the lid R portions 113r can be formed in a large size. Therefore, the opening R portions 111r and the lid R portions 113r can be reliably welded to each other respectively. Accordingly, although the opening R portions 111r and the lid R portions 113r are spaced apart from each other respectively, the sealing reliability therebetween can also be made high.

Subsequently, a method of manufacturing the aforementioned battery 100 will be described. First of all, the lid member 113, the first terminal members 151 and 161, the second terminal members 152 and 162, the fastening members 155 and 165, the first insulation members 157 and 167, and the second insulation members 158 and 168 are prepared respectively. Then, using these members, the positive electrode terminal 150 and the negative electrode terminal 160 are fixedly installed on the lid member 113 (see FIG. 3).

Figure 7:
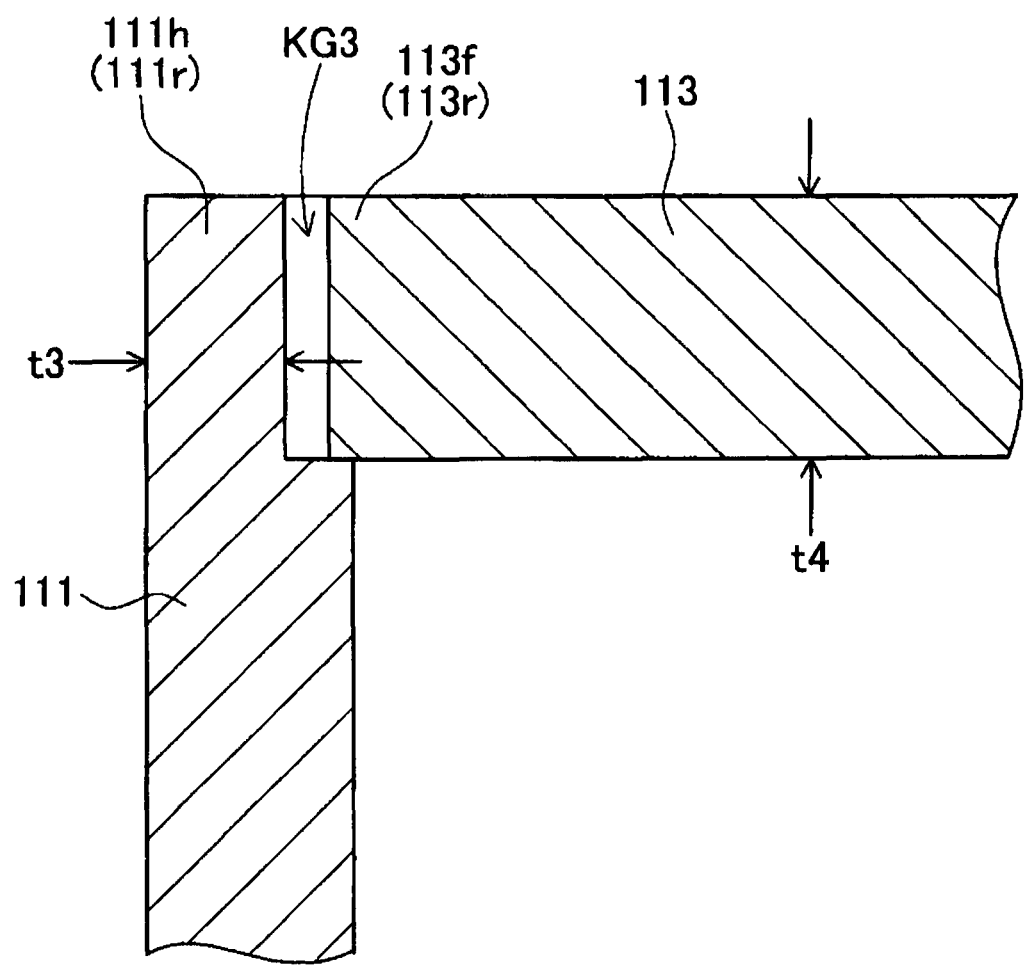
FIG. 7 is an illustrative view showing a B-B cross-section in FIG. 6 according to the embodiment of the invention.

Next, the positive electrode terminal 150 and the negative electrode terminal 160 are connected (welded) respectively to the electrode body 120 that has been separately formed. Besides, the main body member 111 is prepared. Then, in an insertion process, the electrode body 120 is accommodated in the main body member 111, and the lid member 113 is inserted into the opening portion 111h of the main body member 111 (see FIGS. 6 and 7).

In this case, a gap is formed between the opening portion 111h of the main body member 111 and the lid peripheral edge portion 113f of the lid member 113 along an entire circumference thereof. More specifically, the opening long side portions 111a and 111a and the lid long side portions 113a and 113a are arranged apart from each other respectively via the gap KG1. Besides, the opening short side portions 111b and 111b and the lid short side portions 113b and 113b are arranged apart from each other respectively via the gap KG2. Besides, the opening R portions 111r and 111r and the lid R portions 113r and 113r are arranged apart from each other respectively via the gap KG3.

By the way, the lid member 113 is also arranged in a biased manner in the opening portion 111h of the main body member 111 in some cases. For example, in such cases, one of the opening long side portions 111a of the opening portion 111h and the lid long side portion 113a of the lid member 113 that faces that one of the opening long side portions 111a are arranged in such a manner as to abut on each other without forming a gap therebetween, or one of the opening short side portions 111b of the opening portion 111h and the lid short side portion 113b of the lid member 113 that faces that one of the opening short side portions 111b are arranged in such a manner as to abut on each other without forming a gap therebetween. However, as described above, the curvature radius r2 of the lid R portions 113r is set larger than the curvature radius r1 of the opening R portions 111r. Therefore, even in the case where the lid member 113 is thus arranged in a biased manner, the gap KG3 is reliably formed between the opening R portions 111r and 111r and the lid R portions 113r and 113r respectively. Accordingly, the opening R portions 111r and the lid R portions 113r can be reliably prevented from colliding with each other respectively or coming into hard contact with each other respectively in this insertion process.

Figure 8:
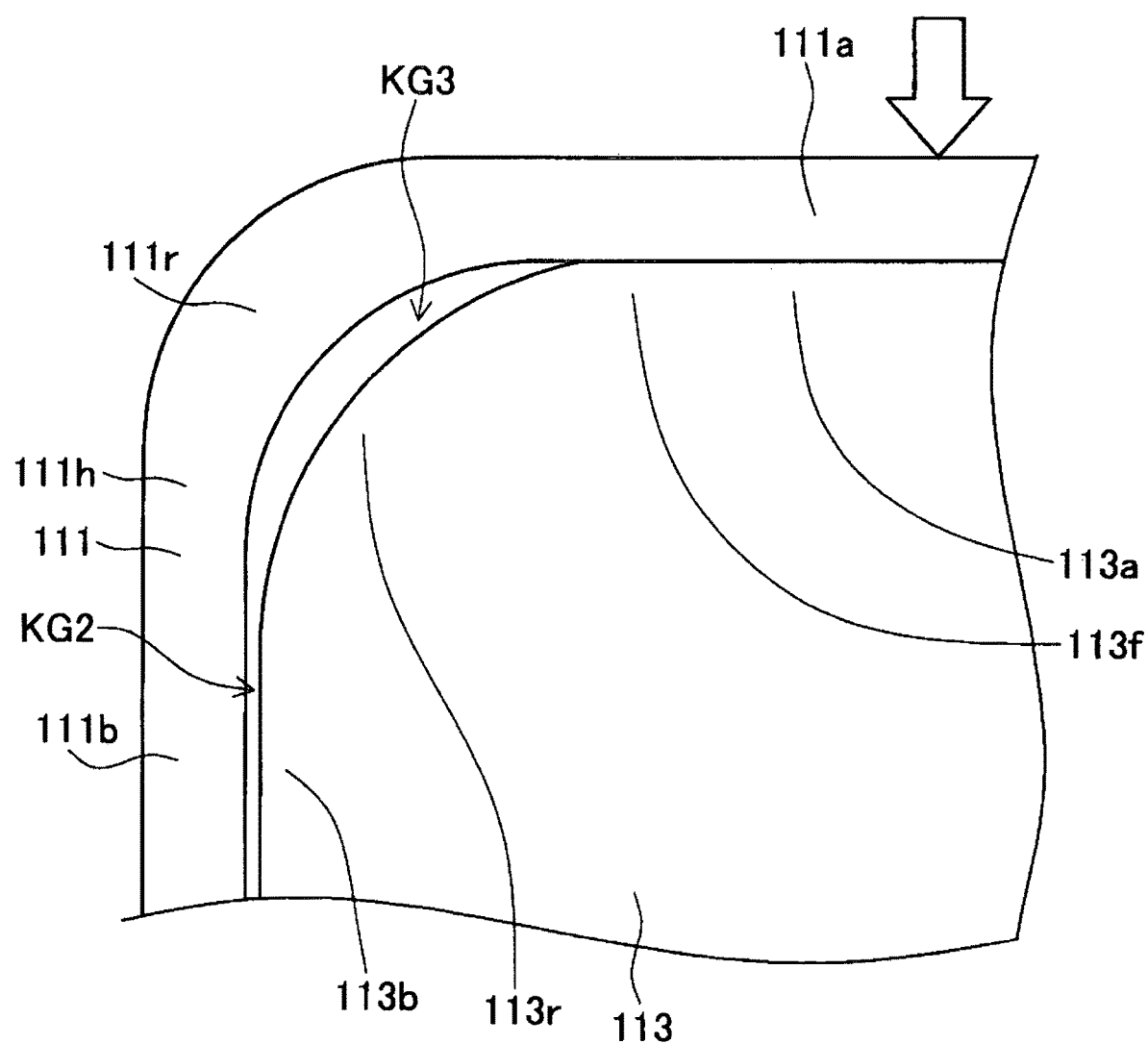
FIG. 8 is an illustrative view showing a state in which an opening long side portion is pressed inward to bring the opening long side portion and a lid long side portion into close contact with each other prior to welding, according to the embodiment of the invention.
Figure 9:
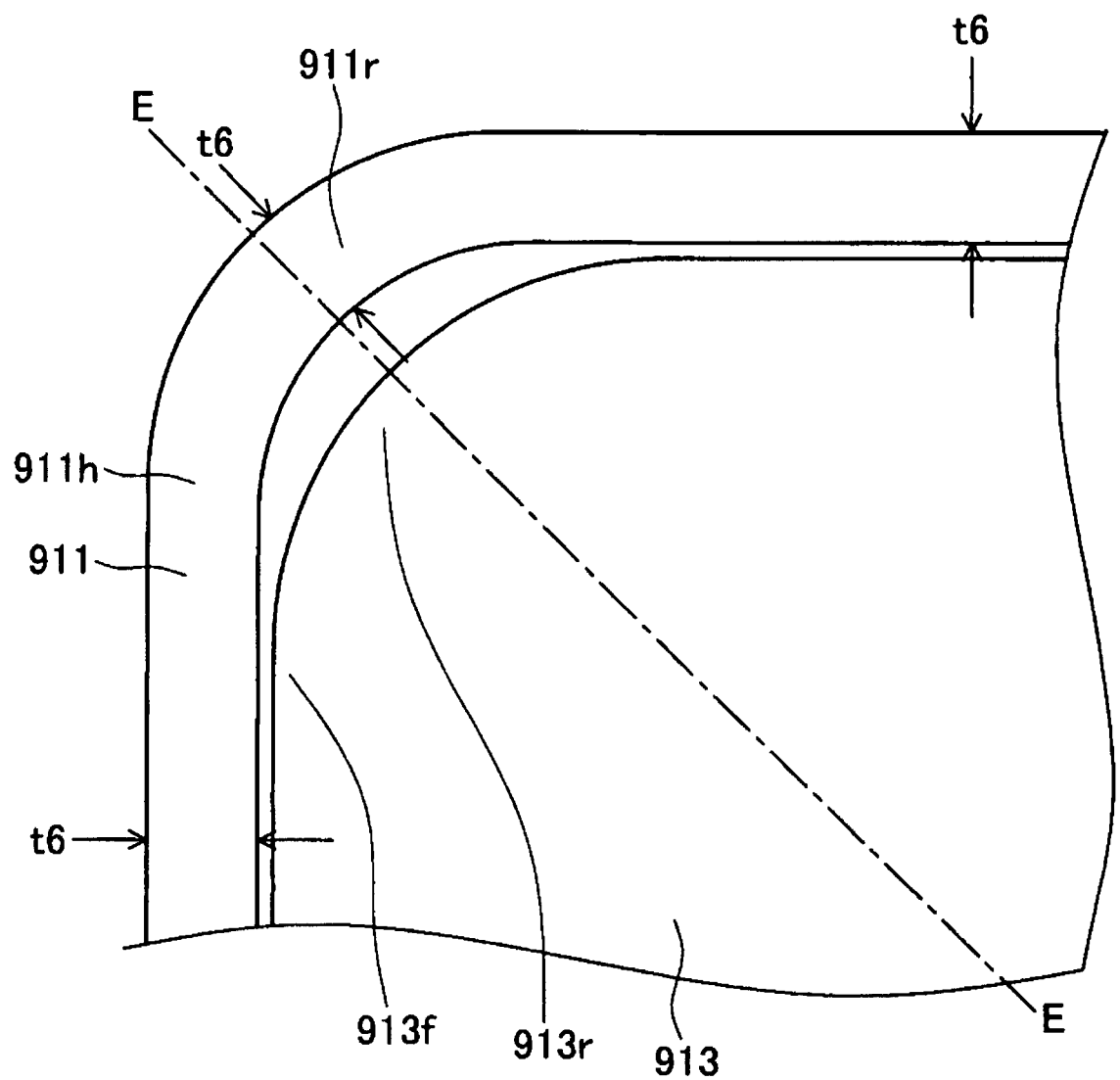
FIG. 9 is a partially enlarged plan view of the vicinity of an opening R portion and a lid R portion prior to welding as viewed from above, according to a reference mode related to the invention.
Figure 10:
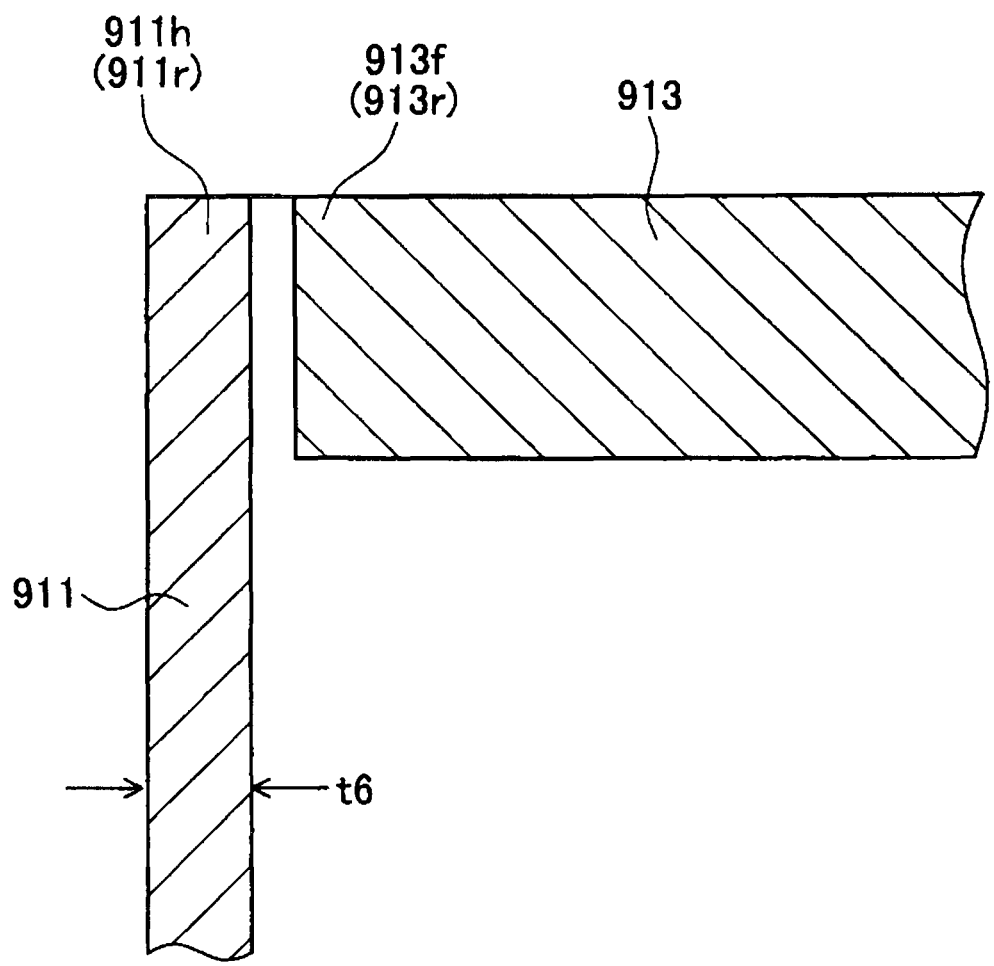
FIG. 10 is an illustrative view showing an E-E cross-section in FIG. 9 according to the reference mode related to the invention.
Figure 11:
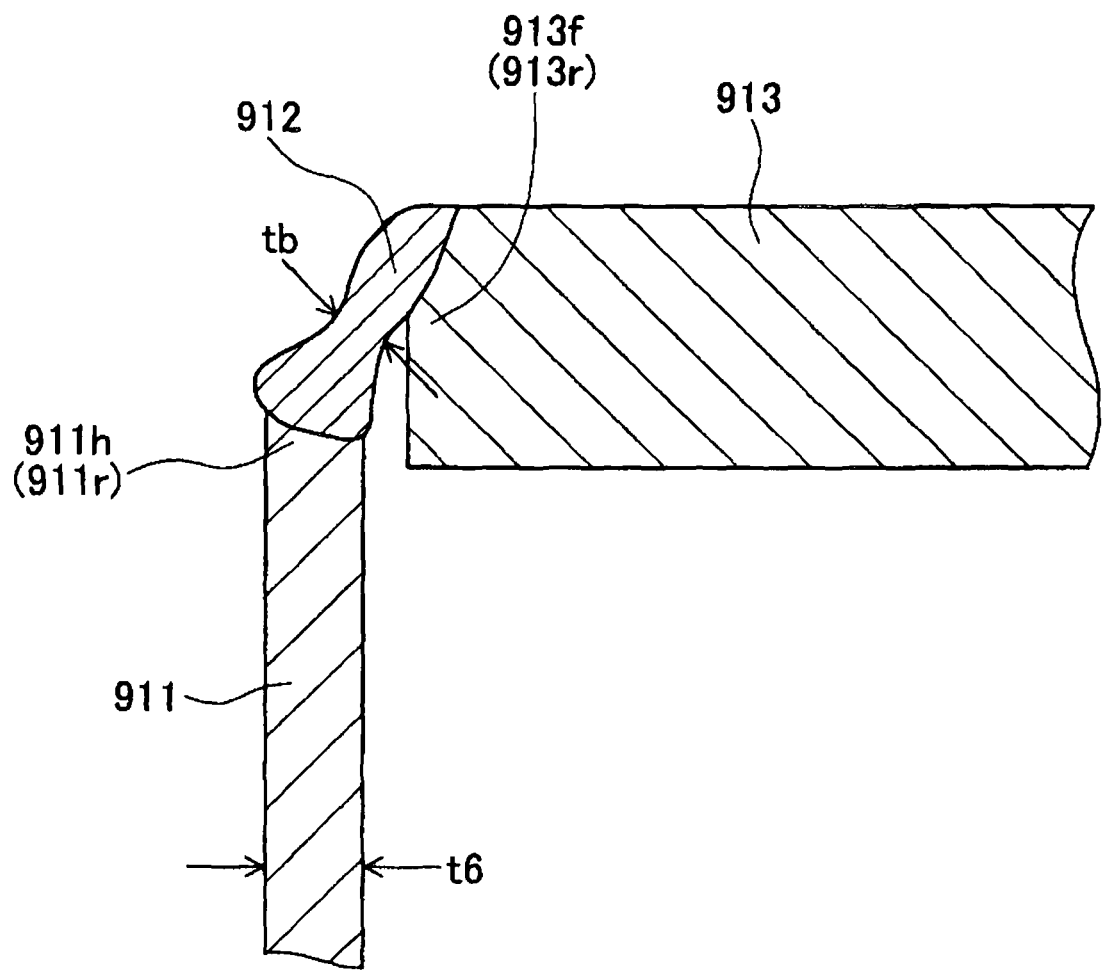
FIG. 11 is an illustrative view showing a welding state of the vicinity of the opening R portion and the lid R portion during welding thereof with an enhanced laser output, according to the reference mode related to the invention.
Figure 12:
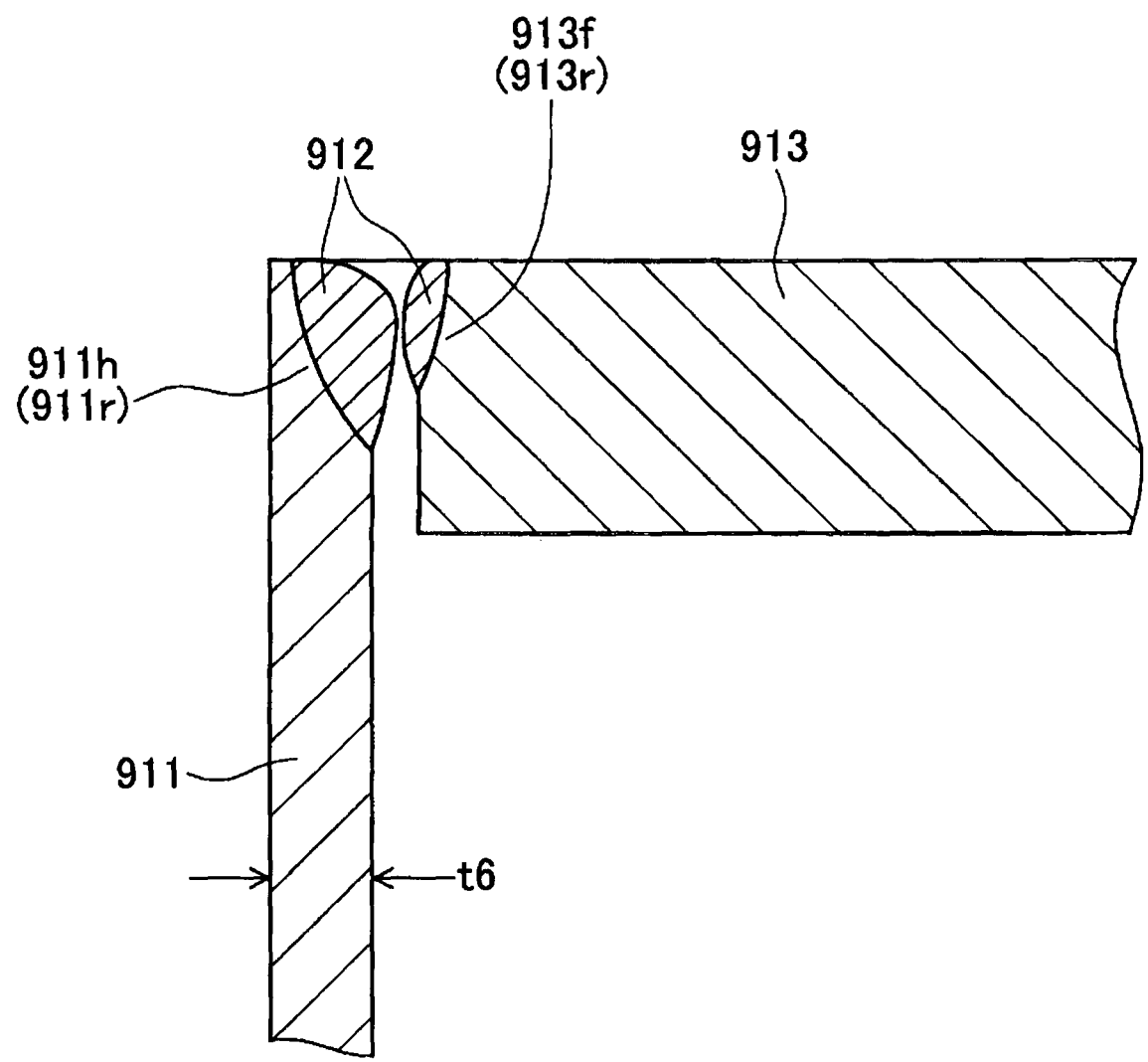
FIG. 12 is an illustrative view showing a welding state of the vicinity of the opening R portion and the lid R portion during welding thereof with a lowered laser output, according to the reference mode related to the invention.

Next, in a welding process, the pair of the opening long side portions 111a and 111a of the main body member 111 are first pressed inward respectively prior to welding, and these opening long side portions 111a and 111a and the pair of the lid long side portions 113a and 113a of the lid member 113 are brought into close contact with each other respectively (see FIG. 8). After that, while maintaining this state, the energy beam (more specifically, the laser beam) LS is radiated from outside the lid member 113 in the thickness direction thereof (from above the lid member 113), more specifically, in a direction perpendicular to the lid member 113, and the opening portion 111h of the main body member 111 and the lid peripheral edge portion 113f of the lid member 113 are welded to each other along the entire circumference thereof. Incidentally, a fiber laser that uses fiber optics as a medium is used as a continuous wave laser (a CW laser) that continuously emits laser light, to radiate this laser beam LS. Thus, part of the opening portion 111h and part of the lid peripheral edge portion 113f are fused and then solidified to form the fused solidified portions 112 that have a square shape in a plan view, and the opening portion 111h and the lid peripheral edge portion 113f are bonded to each other in an airtight manner along the entire circumference thereof via these fused solidified portions 112.

Next, the electrolytic solution 117 is injected from the liquid injection hole 113h into the battery case 110, and the liquid injection hole 113h is sealed in an airtight manner by the sealing member 115. After that, initial charging, aging and various inspections are carried out as to this battery 100. Thus, the battery 100 is completed.

As described above, in the method of manufacturing this battery 100, using the main body member 111 that is configured such that the thickness t3 of the opening R portions 111r and 111r of the opening portion 111h is set larger than the thickness t1 of the opening long side portions 111a and 111a respectively, the lid member 113 is inserted into the opening portion 111h of this main body member 111 (in the insertion process), and then, the laser beam LS is radiated from outside the lid member 113 in the thickness direction thereof to weld the opening portion 111h and the lid peripheral edge portion 113f to each other in an airtight manner along the entire circumference thereof (in the welding process). The opening R portions 111r of the opening portion 111h have the large thickness t3 and a large thermal capacity, and therefore can prevent the depth of fusion from becoming too deep when the laser beam LS is radiated in the welding process. On the other hand, since the thickness t3 of the opening R portions 111r is large, those regions of the opening R portions 111r and the lid R portions 113r which are fused by the laser beam LS can be ensured of a sufficient volume, and the fused solidified portions 112 can be formed in a large size. Thus, the sealing reliably between the opening R portions 111r and the lid R portions 113r can be made high. Accordingly, the battery 100 with the enhanced sealing reliability between the main body member 111 of the battery case 110 and the lid member 113 of the battery case 110 can be manufactured.

Furthermore, in the method of manufacturing this battery 100, the opening R portions 111r and 111r and the lid R portions 113r and 113r are arranged apart from each other respectively in the insertion process. In particular, since the curvature radius r2 of the lid R portions 113r and 113r is set larger than the curvature radius r1 of the opening R portions 111r and 111r respectively, the gap KG3 can be reliably provided between the opening R portions 111r and the lid R portions 113r respectively. Thus, the opening R portions 111r and the lid R portions 113r can be more reliably prevented from, for example, colliding with each other respectively to produce foreign matters such as metal powders and the like during insertion.

On the other hand, if the opening R portions 111r and the lid R portions 113r are arranged apart from each other respectively, it is more difficult to weld these portions to each other respectively, and the sealing reliability therebetween tends to be low. However, the thickness t3 of the opening R portions 111r is set large. Thus, while the depth of fusion of the opening R portions 111r during welding can be restrained, the fused solidified portions 112 that are constituted of parts of the opening R portions 111r and parts of the lid R portions 113r respectively can be formed in a large size. Therefore, the opening R portions 111r and the lid R portions 113r can be reliably welded to each other respectively. Accordingly, the battery 100 in which the sealing reliability between the opening R portions 111r and the lid R portions 113r is also made high although they are spaced apart from each other respectively can be manufactured.

Besides, in the method of manufacturing this battery 100, in the welding process, the opening long side portions 111a and 111a are pressed inward respectively to bring the opening long side portions 111a and 111a and the lid long side portions 113a and 113a into close contact with each other respectively and perform welding. Thus, the opening long side portions 111a and the lid long side portions 113a can be more reliably welded to each other respectively, and the sealing reliability therebetween can be made higher. On the other hand, in the case where the welding process is thus performed, the gap KG1 can be provided between the opening long side portions 111a and the lid long side portions 113a respectively in an unpressed free state. Thus, the opening long side portions 111a and the lid long side portions 113a can be more reliably prevented from colliding with each other respectively to produce foreign matters such as metal powders and the like in the insertion process.

The invention has been described above with reference to the embodiment thereof, but should not be limited to the foregoing embodiment thereof. Needless to say, the invention can be applied after being appropriately modified without departing from the gist thereof.

The invention claimed is:

1. A rectangular battery comprising:
    an electrode body; and
    a battery case made of metal, the battery case having a shape of a rectangular parallelepiped, the battery case accommodating the electrode body, and the battery case having a main body member and a lid member,
    the main body member having a shape of a bottomed rectangular tube, the main body member having a rectangular opening portion that has a pair of opening long side portions, a pair of opening short side portions, and four opening R portions, the four opening R portions linking the opening long side portions and the opening short side portions with each other respectively, and the four opening R portions being curved with arc shapes respectively, and the lid member having a shape of a rectangular plate, the lid member being inserted in the opening portion to seal the opening portion, the lid member having a lid peripheral edge portion, and the lid peripheral edge portion having a pair of lid long side portions that face the pair of the opening long side portions respectively, a pair of lid short side portions that face the pair of the opening short side portions respectively, and four lid R portions that face the four opening R portions respectively, each thickness of the four opening R portions being larger than each thickness of the pair of the opening long side portions respectively, and the opening portion of the main body member and the lid peripheral edge portion of the lid member being configured to be welded airtightly along an entire circumference of the opening portion and the lid peripheral edge portion, wherein the opening R portions and the lid R portions are arranged apart from each other respectively, and are configured to be bonded to each other airtightly, each curvature radius of the lid R portions is larger than each curvature radius of the opening R portions respectively, the opening portion and the lid peripheral edge portion are configured to be bonded to each other airtightly along the entire circumference via a fused solidified portion, the opening long side portions and the lid long side portions are configured to abut each other without forming a gap therebetween, the opening short side portions and the lid short side portions are spaced apart from each other to form a gap, the opening short side portions include a step portion configured to be in direct contact with a bottom surface of the lid member, and the opening long side portions do not include the step portion.

2. The rectangular battery according to claim 1, wherein each thickness of the four opening R portions is larger than each thickness of the pair of the opening short side portions respectively.

3. The rectangular battery according to claim 1, wherein the lid member includes a liquid injection hole that is configured to allow injection of an electrolytic solution.

4. A method of manufacturing a rectangular battery, the rectangular battery having an electrode body and a battery case, the battery case being made of metal and having a shape of a rectangular parallelepiped, and the battery case accommodating the electrode body and having a main body member and a lid member, the main body member having a shape of a bottomed rectangular tube and having a rectangular opening portion, the rectangular opening portion having a pair of opening long side portions, a pair of opening short side portions, and four opening R portions, the four opening R portions linking the opening long side portions and the opening short side portions with each other respectively, and the four opening R portions being curved with arc shapes respectively, and the lid member having a shape of a rectangular plate, the lid member having a lid peripheral edge portion, the lid peripheral edge portion having a pair of lid long side portions that face the pair of the opening long side portions respectively, a pair of lid short side portions that face the pair of the opening short side portions respectively, and four lid R portions that face the four opening R portions respectively, each thickness of the four opening R portions being larger than each thickness of the pair of the opening long side portions respectively, the method of manufacturing the rectangular battery comprising:

inserting the lid member into the opening portion of the main body member; and welding the opening portion and the lid peripheral edge portion to each other airtightly along an entire circumference of the opening portion and the lid peripheral edge portion by radiating an energy beam from outside the lid member in a thickness direction of the lid member, wherein the opening R portions and the lid R portions are arranged apart from each other respectively when inserting the lid member into the opening portion of the main body member, the opening portion and the lid peripheral edge portion are bonded to each other airtightly along the entire circumference via a fused solidified portion into which parts of the opening R portions and parts of the lid R portions are solidified respectively after being fused, when welding the opening portion and the lid peripheral edge portion to each other, each curvature radius of the lid R portions is larger than each curvature radius of the opening R portions respectively, the opening long side portions and the lid long side portions abut each other without forming a gap therebetween, the opening short side portions and the lid short side portions are spaced apart from each other to form a gap, the opening short side portions include a step portion configured to be in direct contact with a bottom surface of the lid member, and the opening long side portions do not include the step portion.

5. The method of manufacturing the rectangular battery according to claim 4, wherein each thickness of the four opening R portions is larger than each thickness of the pair of the opening short side portions respectively.

6. The method of manufacturing the rectangular battery according to claim 4, wherein when welding the opening portion and the lid peripheral edge portion to each other, the pair of the opening long side portions are pressed inward respectively to bring the pair of the opening long side portions and the pair of the lid long side portions into close contact with each other respectively, and the opening portion and the lid peripheral edge portion are welded to each other with keeping the close contact with each other.

7. The method of manufacturing the rectangular battery according to claim 4, wherein the lid member includes a liquid injection hole that is configured to allow injection of an electrolytic solution.

* * * * *